United States Patent [19]

Christman

[11] Patent Number: 5,408,278
[45] Date of Patent: Apr. 18, 1995

[54] METHOD AND DEVICE FOR ENHANCING VISUAL AND COLOR PERCEPTION

[76] Inventor: Ernest H. Christman, 1055 Matador, SE., Albuquerque, N. Mex. 87123

[21] Appl. No.: 896,406

[22] Filed: Jun. 10, 1992

Related U.S. Application Data

[63] Continuation-in-part of Ser. No. 789,796, Nov. 12, 1991, abandoned, which is a continuation-in-part of Ser. No. 617,172, Nov. 23, 1990, abandoned.

[51] Int. Cl.$^6$ ................................................ G02C 7/10
[52] U.S. Cl. .................................... 351/44; 351/163; 351/165; 359/464
[58] Field of Search ............ 351/44, 45, 46, 49, 351/162, 163, 165; 359/464

[56] References Cited

U.S. PATENT DOCUMENTS

| | | |
|---|---|---|
| 1,745,107 | 9/1927 | Mendoza . |
| 2,136,303 | 11/1938 | Lumiere ........................... 359/464 |
| 3,432,220 | 3/1969 | Schreiner ........................ 351/44 |
| 3,591,263 | 7/1971 | Esterson ......................... 351/44 |
| 3,701,590 | 10/1972 | Zeltzer . |
| 3,877,797 | 4/1975 | Thornton, Jr. . |
| 3,963,330 | 6/1976 | Boniuk ............................ 351/44 |
| 4,247,177 | 1/1981 | Marks et al. .................... 351/44 |
| 4,836,647 | 6/1989 | Beard .............................. 359/464 |

FOREIGN PATENT DOCUMENTS 1141252 1/1969 United Kingdom .

OTHER PUBLICATIONS

Coblentz et al; "Spectral–Transmissive Properties And Use Of Colored Eye–Protective Glasses", Circular Of The National Bureau Of Standards, Jun. 1938, pp. 1–28.

Primary Examiner—Ricky D. Shafer
Attorney, Agent, or Firm—Jacobson, Price, Holman & Stern

[57] ABSTRACT

Specially balanced and integrated lens pairs, one lens allowing transmission of light predominately from the shorter half of the visible spectrum (400 to 550 nm.) and the other lens allowing transmission of light predominately from the longer half of the visual spectrum (from 550 to 750 nm.), are used to subtract specific quantities of selected visible light from the ambient input into each of the two eyes. This lens pair improves visual discrimination for normal individuals and augments color perception in color-deficient individuals.

6 Claims, 16 Drawing Sheets

Wavelength of Light in Nanometers

Figure 12
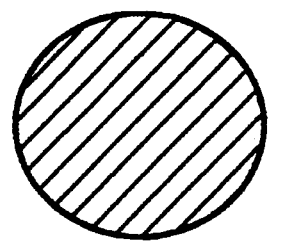 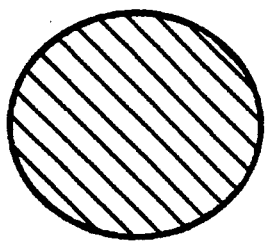 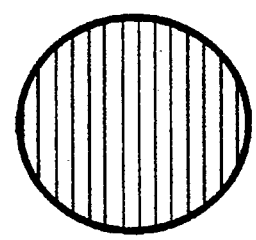
Green-yellow        Yellow          Orange
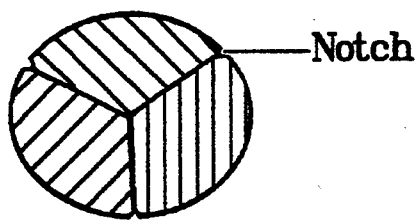
Green-yellow : Yellow : Orange Figure 13
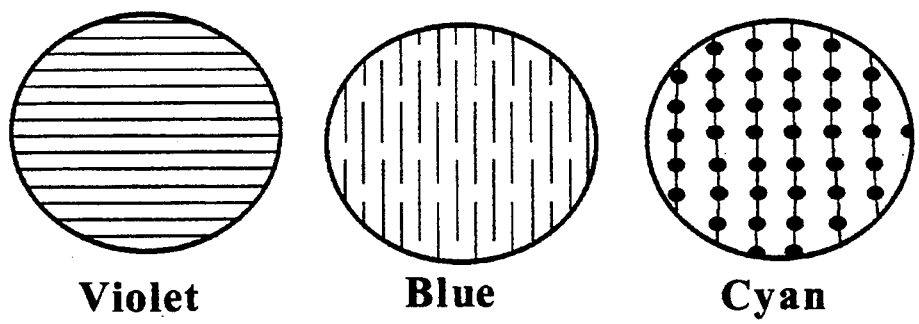
Violet   Blue   Cyan
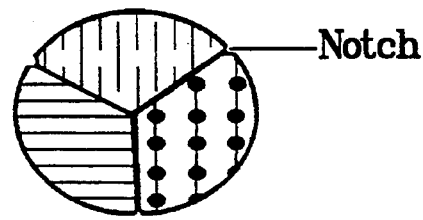
Violet : Blue : Cyan

METHOD AND DEVICE FOR ENHANCING VISUAL AND COLOR PERCEPTION

RELATED APPLICATIONS

This application is a continuation-in-part of application Ser. No. 07/789,796, filed Nov. 12, 1991, which is a continuation-in-part of application Ser. No. 07/617,172, filed Nov. 23, 1990, both now abandoned.

FIELD OF THE INVENTION

This invention relates to visual enhancement, and in particular to improved color perception.

BACKGROUND OF THE INVENTION

Eyeglasses can be made of specific colors for visual enhancement of certain colors under certain viewing circumstances. For example, yellow, orange and red lenses will block wavelengths of 400 nm. to 530 nm. range which constitute violet, blue, blue-green and green light. This elimination of the shorter wavelengths (400 nm. to 530 nm.) allows the longer wavelength light (530 nm. to 750 nm.) to be perceived better. Chromatic aberration is reduced and focusing is sharper.

Blue colored lenses will block the red-orange-yellow light spectrum having wavelengths in the range of (530 nm. to 750 nm.). The elimination of these longer wavelengths allows objects radiating shorter blue-cyan-green wavelengths of light (400 nm. to 530 nm.) to be perceived better. Elimination of red-orange-yellow wavelengths of light enhances both focusing of and perception in the blue, cyan and green spectrums having wavelengths of (400 nm. to 530 nm.). Lenses that block red-orange-yellow light enhance viewing in circumstances where blues predominate, such as in shadows.

Heretofore a viewer had to choose to wear, either yellow glasses that blocked the blue light, or blue glasses that blocked the yellow light.

In U.S. Pat. No. 3,877,797 to William Thorton, Jr., color discrimination was improved by eliminating two narrow, selected bands of light to better delineate color boundaries and increase subjective color perception. This was achieved by cementing yellow and blue filters together into a single lens. The lenses could be used in spectacles.

Thorton's invention does not enhance color vision. It only allows one to better distinguish color boundaries such as when green becomes yellow, or red becomes orange. It does nothing to augment perception in color-deficient individuals.

In U.S. Pat. No. 3,701,590 to Harry Zeltzer, color discrimination is enhanced by using a red contact lens in only one eye. This is based on subjective responses and the subjects' improved ability to see patterns in the Ishihara color testing plates. There is no explanation as to mechanism of achieving these results.

In U.K. Patent 1,141,252 to Kurt Esterson, protective goggles are used in which one eyepiece filter plate is yellow and the other eyepiece filter plate is orange. The purported purpose is to afford protection against dazzle and to increase the contrast of objects observed.

In U.S. Pat. No. 1,745,107 to Rafael Mendoza, lenses of different colors before each eye are used in a cinematographic device to achieve a visual effect of "a single image of each picture standing out in relief". Mendoza makes no reference to color integration or viewing in the natural environment, but only to color use in "stereoscopic views".

SUMMARY OF THE INVENTION

By the present invention, specially balanced and integrated lens pairs, one lens allowing transmission of light predominately from the shorter half of the visible spectrum (400 to 550 nm.) and the other lens allowing transmission of light from the longer half of the visual spectrum (from 550 to 750 nm.), are used to subtract specific quantities of selected visible light from the ambient input into each of the two eyes. This lens pair improves visual discrimination for normal individuals and augments color perception in color-deficient individuals.

The brain can selectively perceive with one eye while suppressing an input from the other eye. However, it is more comfortable to view with both eyes open and have the brain "turn off" the eye not looking at the object of interest.

This selective use/suppression relationship of the two eyes is used in presbyopic persons not wishing to use bifocals. One eye can be fit with distant vision correction and the other eye fit with near vision correction. The brain automatically selects the image needed, near or far, and suppresses the image not needed.

The concept of binocular selective seeing has not heretofore been applied to colors in the environment. The invention provides use of specific wavelengths of light which provide enhanced visual perception and improved color perception under certain viewing circumstances.

When blue wavelengths of the light are reduced by using an orange glass, blue is darkened, giving a greater contrast of, for example, clouds in the sky. Alternately, if yellow-red wavelengths of light are reduced by using cyan lenses, the viewer can see deeper into shaded areas.

The invention uses lens pairs of specifically designed different colors, one lens of the pair allowing transmission primarily of the visible light spectrum that comprises the shorter wavelengths (from 400 to 550 nm.), and the other lens of the pair allowing transmission of light primarily from the longer wavelengths (550 to 750 nm.) of the visual spectrum. This lens pair is placed before the two eyes to combine the advantages of each color, provided that balance criteria are met, which will be described presently.

The visible color spectrum ranges from approximately 400 nm. to 750 nm. When all visible energies of the spectrum are equal and combined, there is white, the composite of all colors. Individual colors are seen when the range of energy associated with a limited wavelength of light is transmitted from objects to the observer. Violet is seen at the 420 nm. range of light, blue at 470, green at 520, yellow at 570, orange at 610, and red at 680. The individual colors are called hues. If there is some white light mixed with the individual color, the color is unsaturated, the degree depending upon the mix of white and individual color.

In the case of an orange-cyan lens pair, one eye will see predominately in the longer wavelength color area with commensurate enhancement. The other eye will see predominately in the shorter wavelength area, with commensurate enhancement. The brain will integrate the colors and/or alternately select the best eye input for the circumstances, improving overall visual performance, provided each colored lens is specifically balanced to the other by the method described herein.

If a pair of orange glasses is used to view a landscape, the blues will be filtered out proportionally to the saturation of the orange hue. This darkens the blue of the sky and enhances the white of clouds or the white of a baseball or golf ball. By filtering the blue, the chromatic aberration of the eye's optical system is reduced, and the red-orange-yellow light is seen more clearly.

If a pair of cyan glasses is used to view a landscape, the red-orange-yellow will be filtered out proportionally to the saturation of the blue hue. This reduces the red-orange-yellow light and enhances the focusing of the green-blue spectrum by decreasing the normal chromatic aberration of the eye. The viewer will be able to see deeper into darker areas (shadows) with greater clarity.

By having one eye view with a cyan lens and the other eye view with an orange lens, provided that the colors are wavelength and light-balanced, the benefits of the two lenses are combined and overall vision augmented. This augmentation of vision is achieved by brain integration of the two eyes with selective attention given to the input from the eye with the colored lens appropriate to the situation. This is especially helpful in a changing landscape, where one goes from full sun into shadows, as in skiing or viewing a baseball or golf ball that travels against a blue sky into a shadow.

Color is perceived by three types of retinal cones, blue, green and red-sensitive cones, each cone responding to a certain range of colors. The blue-sensitive cones respond primarily to the wavelengths in the shorter range of the visual spectrum, from 400 nm. to 530 nm., with a peak sensitivity response at 450 nm. The green-sensitive cones respond primarily to the wavelengths in the middle range, from 450 nm. to 650 nm. with a peak sensitivity response at 540 nm. The red-sensitive cones respond from 500 nm to 750 nm., with a peak sensitivity response at 600 nm.

The retinal cones are also sensitive to ambient light above a minimum value. The output from each cone goes to different types of retinal ganglia. Certain large ganglion cells are sensitive to absolute light values. Certain small ganglion cells are sensitive to the colors represented by the pigment of the stimulating cone. Impulses are transmitted to the brain from these types of ganglion cells. Schematically, the large ganglion cells may be represented as transmitting a black-and-white image, while the small ganglia supply the color information to overpaint the black-and-white image.

An analogy to a color television receiver is illustrative. Television signals are sent in black-and-white compatible with adequate resolution. Color signals are sent and overpainted with lesser resolution. In the mechanism of the human eye, the large ganglia transmit in black-and white, and the smaller ganglia transmit color information in lesser detail that overpaints the black-and-white image.

The present invention makes use of the fact that the input from each eye goes to representative areas of the brain for processing. Different inputs from the two eyes are generally superimposed, and such phenomena as depth perception occur from the processing and integration of disparate images from the two eyes.

The brain may not superimpose images under certain circumstances. If the image from one eye is out of focus for distance, that image will be suppressed in favor of the image that is clear for distance. Conversely, if only one eye is nearsighted, that image will be selected for near tasks and the non-nearsighted image suppressed.

Regarding color, the separate color input from each eye will be integrated into a new color only if certain conditions are met. If these conditions are not met, the colors will be superimposed, and the eye will see one and then the other, alternately, but not see both images simultaneously. The invention described herein is the discovery of a means and devices that permit color integration when the two eyes have different color inputs.

The object of my color-paired lens system is to improve visual and color perception. In the normal individual utilizing this invention, the brain selects the visual input to best fit the circumstances. While both eyes see, the enhanced image is brainselected, such as in skeet-shooting on a clear day. Here, the orange-enhanced image (which is blue-blocked) gives a better contrast of a white disc against a darker blue sky. In playing baseball or golf, the flight of a white ball is better followed against a darker blue sky seen with the orange lens, and if the ball goes into a shadow, it is perceived better with the cyan enhanced (orange-blocked) eye. Overall visual performance in a broad range of circumstances is enhanced by the paired colored lenses.

Green color-deficient individuals can perceive green better if the brain "overpaints" the poorly-perceived green with a properly balanced lens pair that transmits a green-yellow to one eye and a green-blue to the other eye. The yellow and blue components, when combined in the brain, cancel out each other by forming grey-white, leaving the green components to summate and overpaint the green object. By this mechanism, a green-deficient individual who had previously seen a green object as gray (uncolored because his green cones do not transmit a green signal) now sees the same object as green. The brain produces the green color from the different inputs from each of the two eyes. The green-deficient cones of the retina are bypassed, allowing an individual to perceive green.

The saturation of colors in the lens pair is varied according to desired performance. In color-deficient individuals, the lens colors would be saturated in proportion to the color deficiency; the greater the deficiency, the more saturated the color of each lens of the pair. (A saturated color has no white mixed with it.) Also, with a high degree of color deficiency, the best cerebral color effect is achieved with lens pairs that closely approximate the deficient hue, one lens transmitting colors in a wavelength shorter than that of the deficiency, and the other lens transmits wavelengths longer than the deficient color. In lesser degrees of color deficiency, the colors selected for the lens pair will not be as close to the deficient color in wavelength, shorter and longer respectively, to achieve the desired degree of perceived color enhancement in the color-deficient individual.

In individuals with normal color vision, color perception is enhanced by the invention. In the visual spectrum at 540 nm., which is green, the change in wavelength the average individual can detect is 3 nm. With the herein described color-enhancing lens pair, the wavelength shift at 540 mn. approaches 1 nm., which is one wavelength of light.

Over-all light transmission of the lenses can be altered by adding additional, appropriate elements to the composition of the lenses.

These lenses can be combined with other optical enhancements such as ultraviolet blocking coatings and mirrored front surfaces. The ultraviolet coating prevents harmful light from entering the eye. The mirrored coating can cosmetically disguise the difference in colors of the two lenses.

These and other objects of the invention, as well as many of the intended advantages thereof, will become more readily apparent when reference is made to the following description taken in conjunction with the accompanying drawings.

Sum of light transmission through the lenses at 400 nm.=100%
Sum of light transmission through the lenses at 450 nm.=100%
Sum of light transmission through the lenses at 500 nm.=100%
Sum of light transmission through the lenses at 550 nm.=100%
Sum of light transmission through the lenses at 600 nm.=100%
Sum of light transmission through the lenses at 650 nm.=100%
Sum of light transmission through the lenses at 700 nm.=100%
Sum of light transmission through the lenses at 750 nm.=100%

Figure 3:
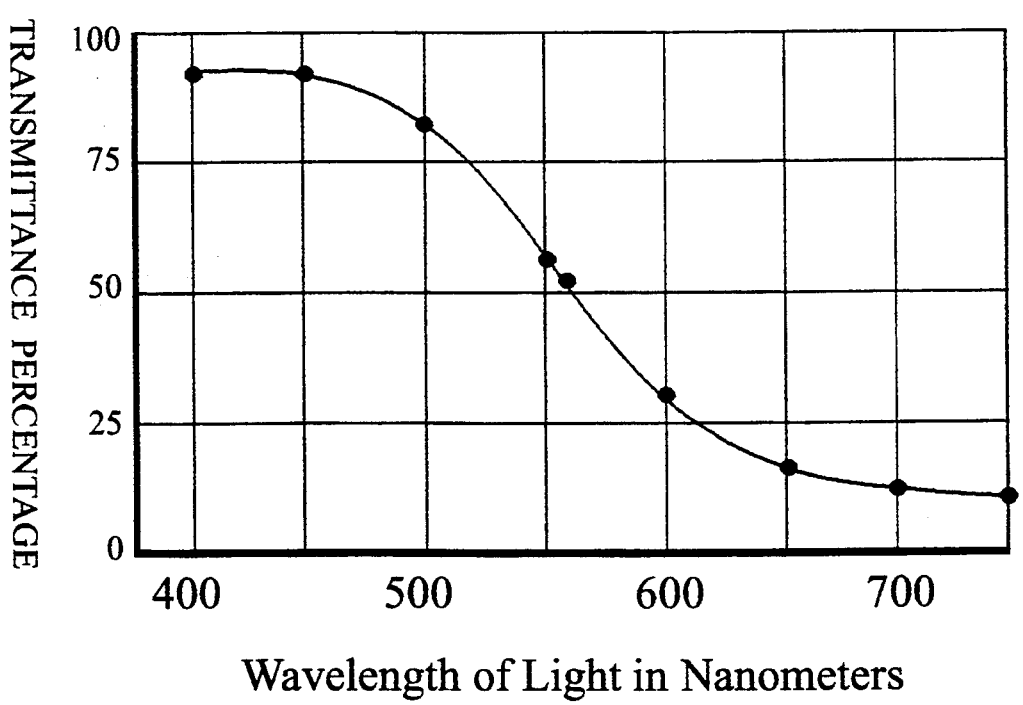
FIG. 3 is a transmission graph for a lens transmitting light predominately in the wavelength band from 400 to 550 nm. The color is blue-green or cyan.
Figure 4:
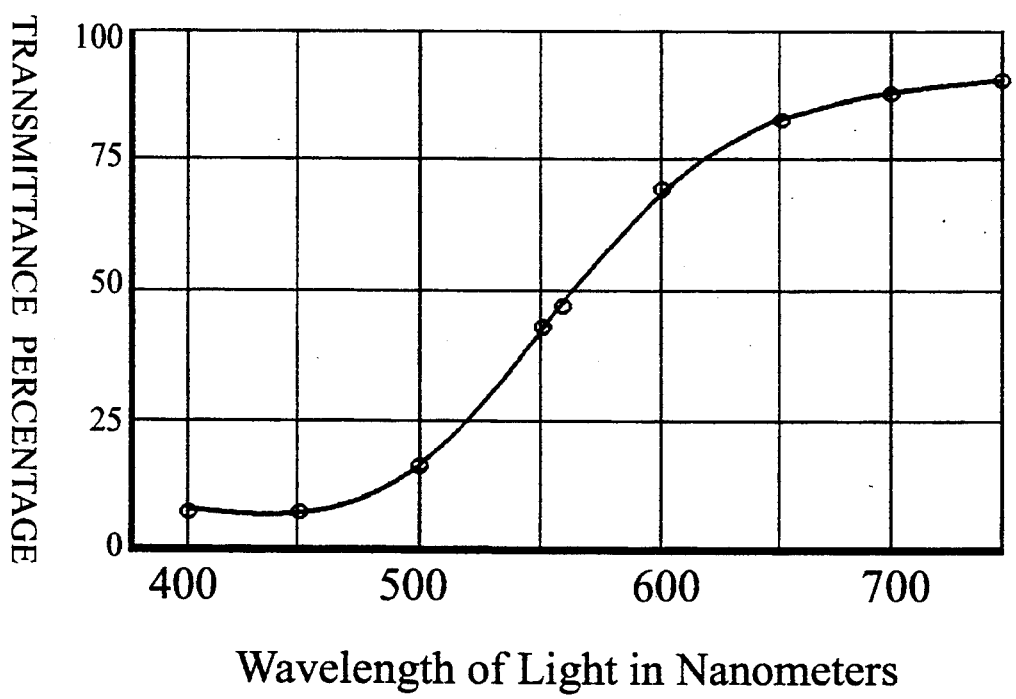
FIG. 4 is a transmission graph for a lens transmitting predominately light in the wavelength band from 550 to 750 nm. The color is orange.
Figure 6:
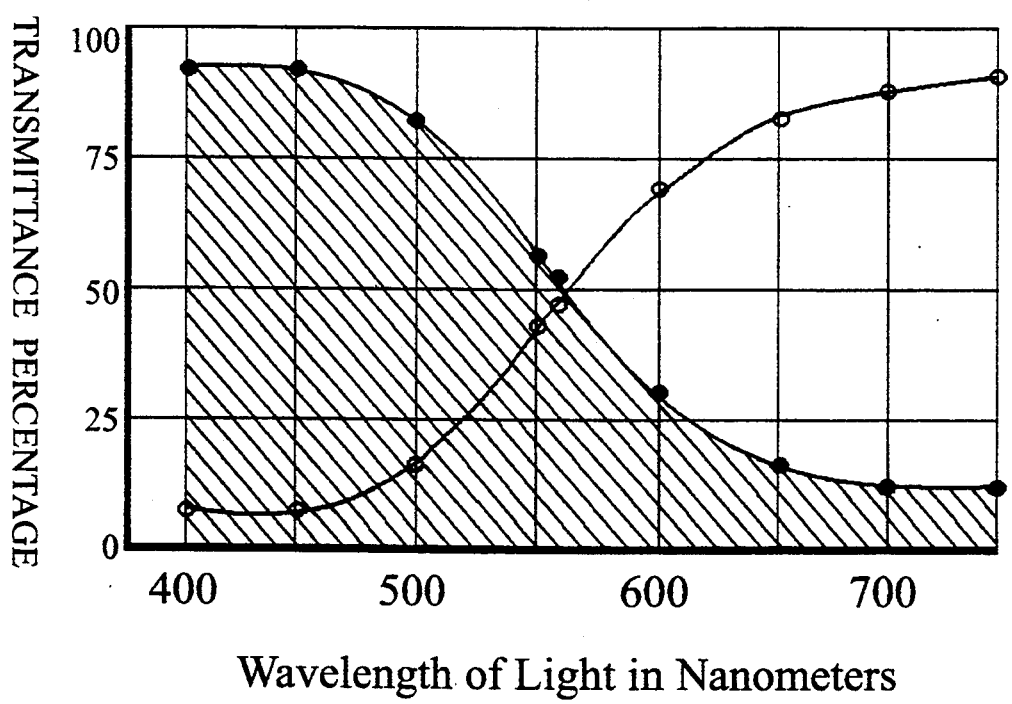
Figure 7:
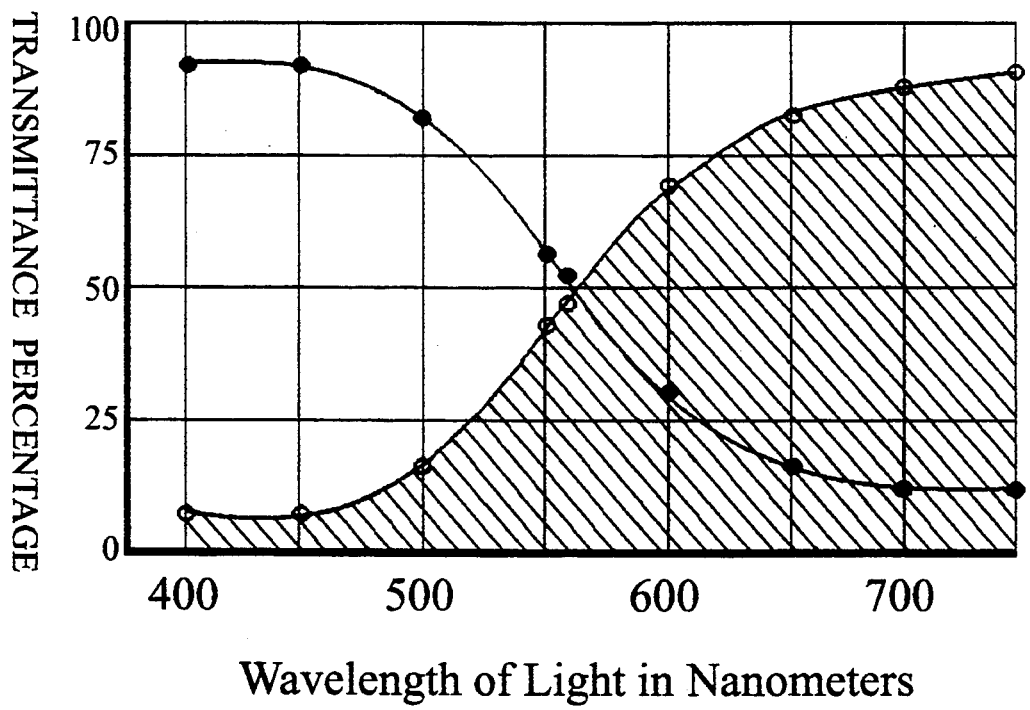

FIG. 6 illustrates that the area under the curve corresponding to the shorter-wavelength transmitted light of FIG. 3 is equal to the area under the curve corresponding to the longer-wavelength transmitted light shown in FIGS. 4 and 7.

FIG. 7 illustrates that the area under the curve corresponding to the longer-wavelength transmitted light of FIG. 4 is equal to the area under the curve corresponding to the shorter-wavelength transmitted light shown in FIGS. 3 and 6.

Figure 8:
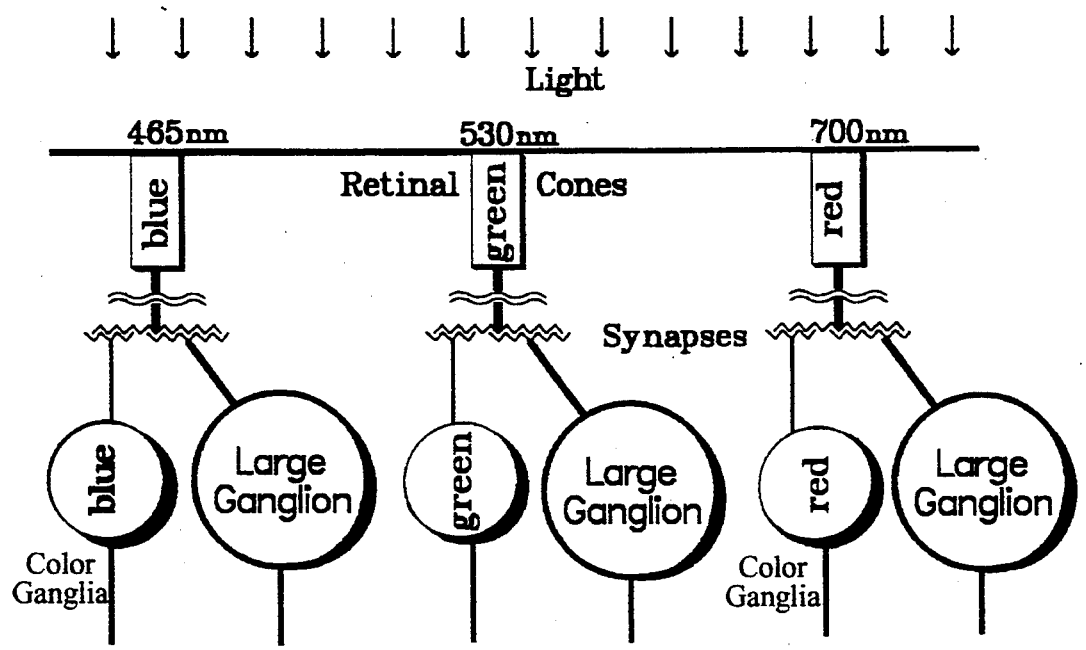

FIG. 8 is a schematic representation to illustrate three different types of retinal cones, each sensitive to a specific range of the visual spectrum. The output from each of the cones goes to different types of ganglion cells in the retina. The large ganglion cells are sensitive to total light values and transmit information that forms black-and-white cerebral images. The smaller ganglia are color-sensitive and send color information that overpaints non-colored images.

Figure 9:
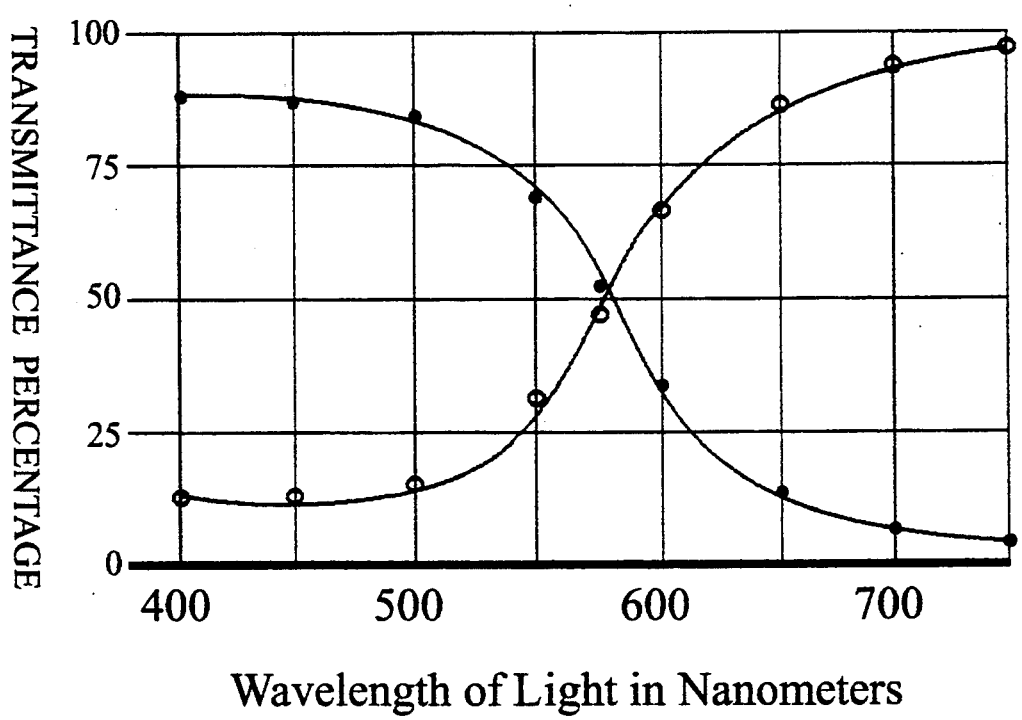

FIG. 9 is a transmission graph for a lens pair used in the treatment of the standard type of red-color deficiency. One lens is cyan, the other orange.

FIGS. 10A–10C represent transmission graphs for the colors violet-blue (peak transmission 455 nm.), blue (peak transmission 470 nm.), and cyan (peak transmission 490 nm.). These graphs represent three colors from the transmission band from 400 to 550 nm., and represent the three colors chosen from this band which are incorporated into a composite lens.

FIGS. 11A–11C represent transmission graphs for the colors green-yellow (peak transmission 555 nm.), yellow (peak transmission 570 nm.), and orange (peak transmission 590 nm.) These graphs represent three colors from the transmission band from 550 to 750 nm. and represent the three colors chosen from this band which are incorporated into a composite lens.

FIG. 12 demonstrates that a composite lens is comprised of three equal, pie-shaped segments of lenses comprising the colors of FIG. 10A–10C, all of which transmit light predominately in the 400 to 550 nm. range.

FIG. 13 demonstrates that a composite lens is comprised of three equal, pie-shaped segments of lenses comprising the colors of FIGS. 11A–11C, all of which transmit light predominately in the 550 to 750 nm. range.

Figure 14:
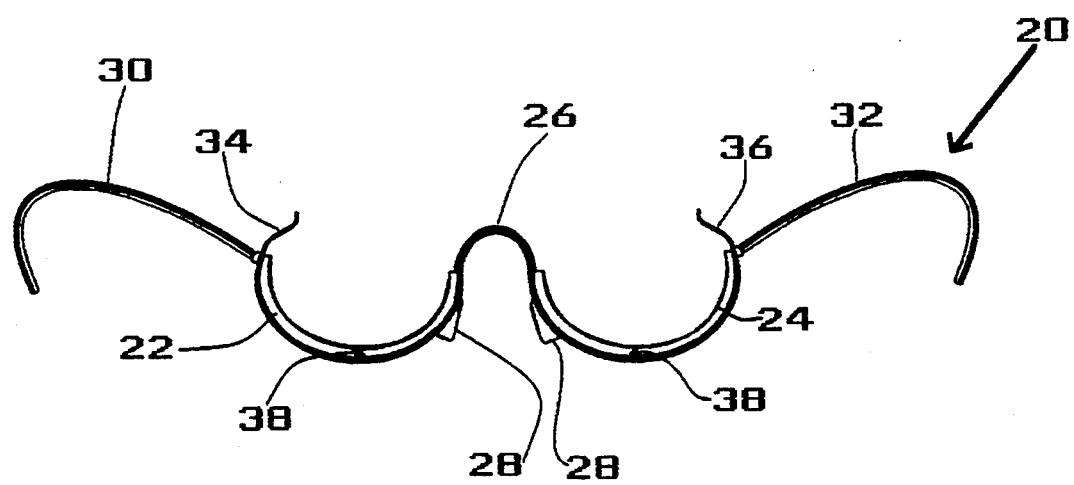
Figure 15:
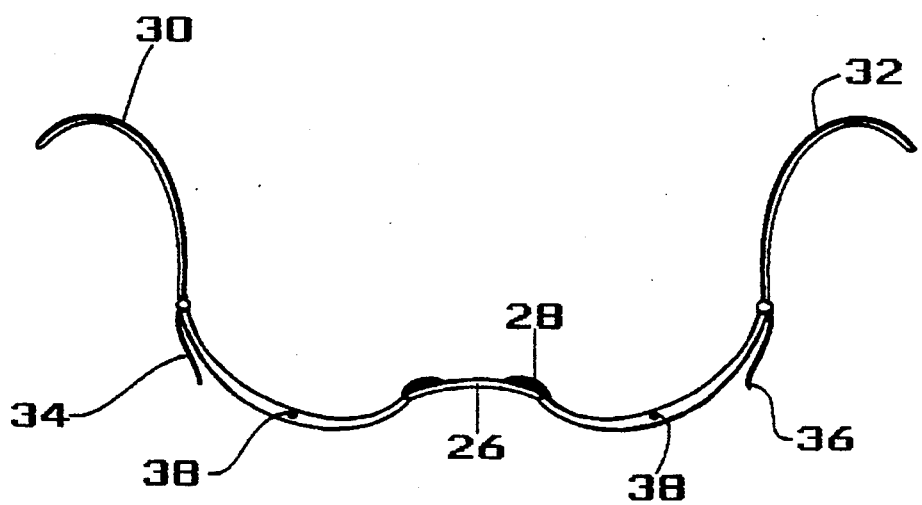
Figure 16:
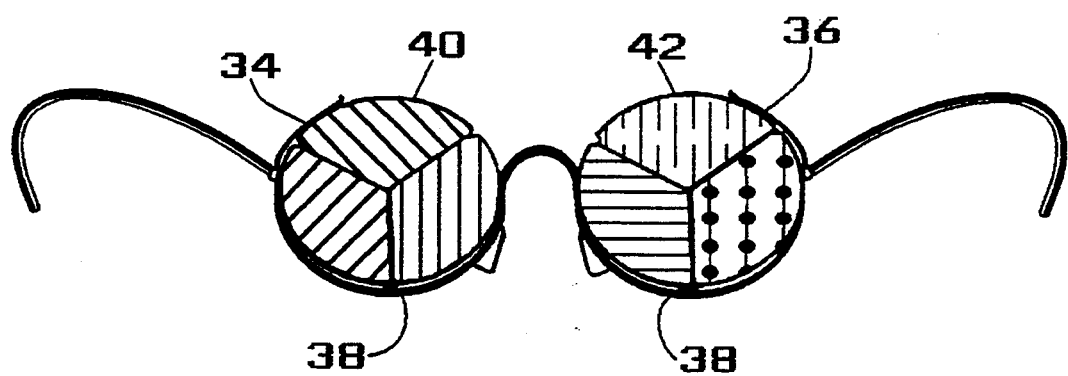

FIGS. 14, 15 and 16 illustrate an eyeglass frame for accommodating the composite lens pair of FIGS. 12 and 13. A tension spring of the lens holders keeps the lenses in place but allows the lenses enough slack to be rotated with finger pressure. A projection in a groove engages with a notch in the lens to align the lenses and then retain them in position for viewing.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

The invention involves a pair of lenses, each having different color-transmission characteristics, that enhances visual and color perception when objects are viewed binocularly. The lens pair consists of colors that represent different wavelengths of light, one lens transmitting predominately the short half of the visual spectrum (400 to 550 nm.) and the other lens transmitting predominately the long wavelengths of the visual spectrum (550 to 750 nm.). The invention is not only the use of two different lenses to achieve color integration, but the specific, balanced light transmissions of the paired lenses so that the brain will be able to achieve color integration for both color enhancement in the normal viewer and also color generation in the color-deficient viewer.

The visual spectrum ranges from approximately 400 nm. to 750 nm. and is divided into three regions: blue (short wavelength), green (middle wavelength) and red (long wavelength). Blue dominates the short end of the visual spectrum, with a peak of psychologically perceived "blueness" at about 460 nm. Green is in the middle range, with a peak of "greenness" at 525 nm. Red is at the end range of the long wavelength region, with a peak of "redness" occurring at approximately 680 nm. An equal combination of all the colored elements of light results in the color white. A specific color is obtained by "subtracting out" an opposite color or colors from the visual spectrum by using appropriate filters that do not allow these colors to pass through.

For example, the color green is obtained by subtracting or blocking out blue and red from the visual spectrum while allowing green light to pass. The saturation or "purity" of a color is determined by the percentage of white light that is mixed with the color.

Figure 1:
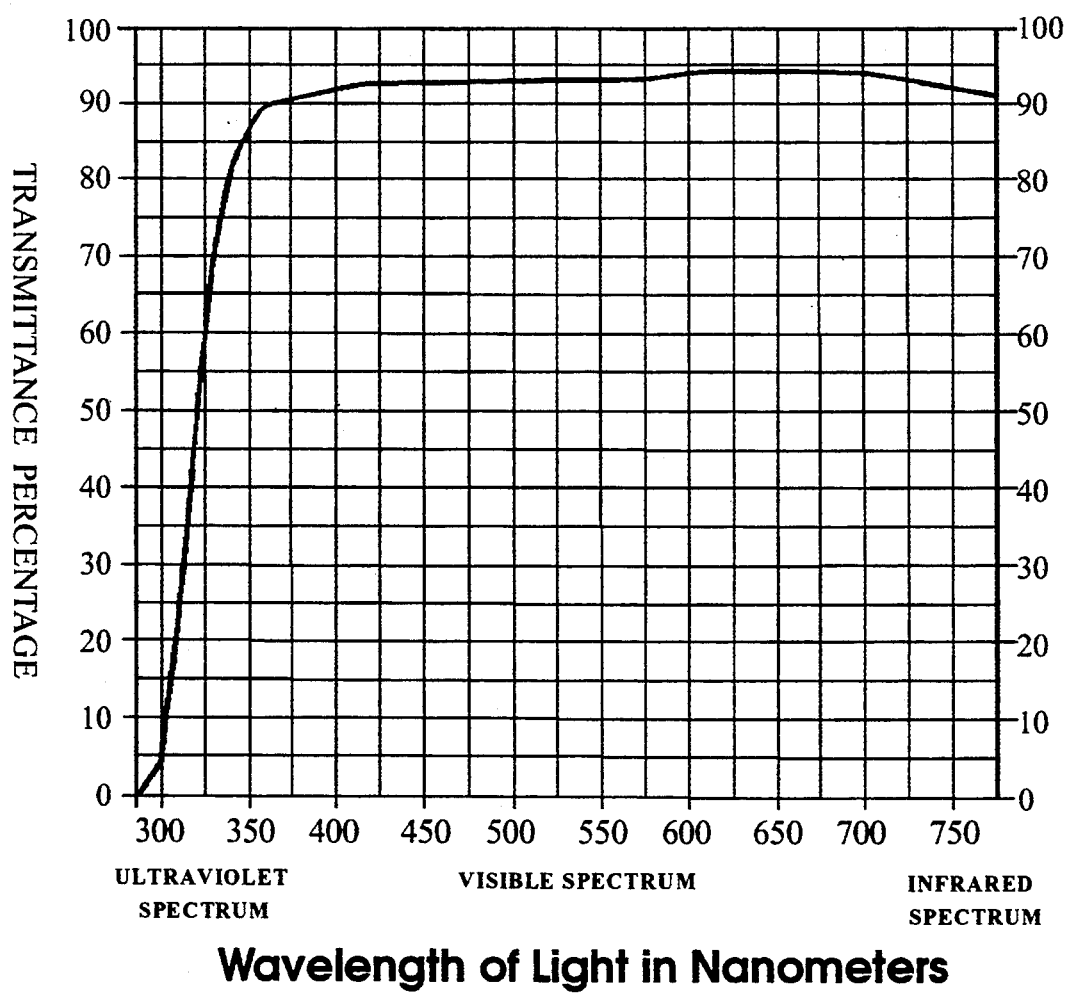
FIG. 1 illustrates a clear glass lens transmitting all wavelengths of the visual light spectrum equally.
Figure 2:
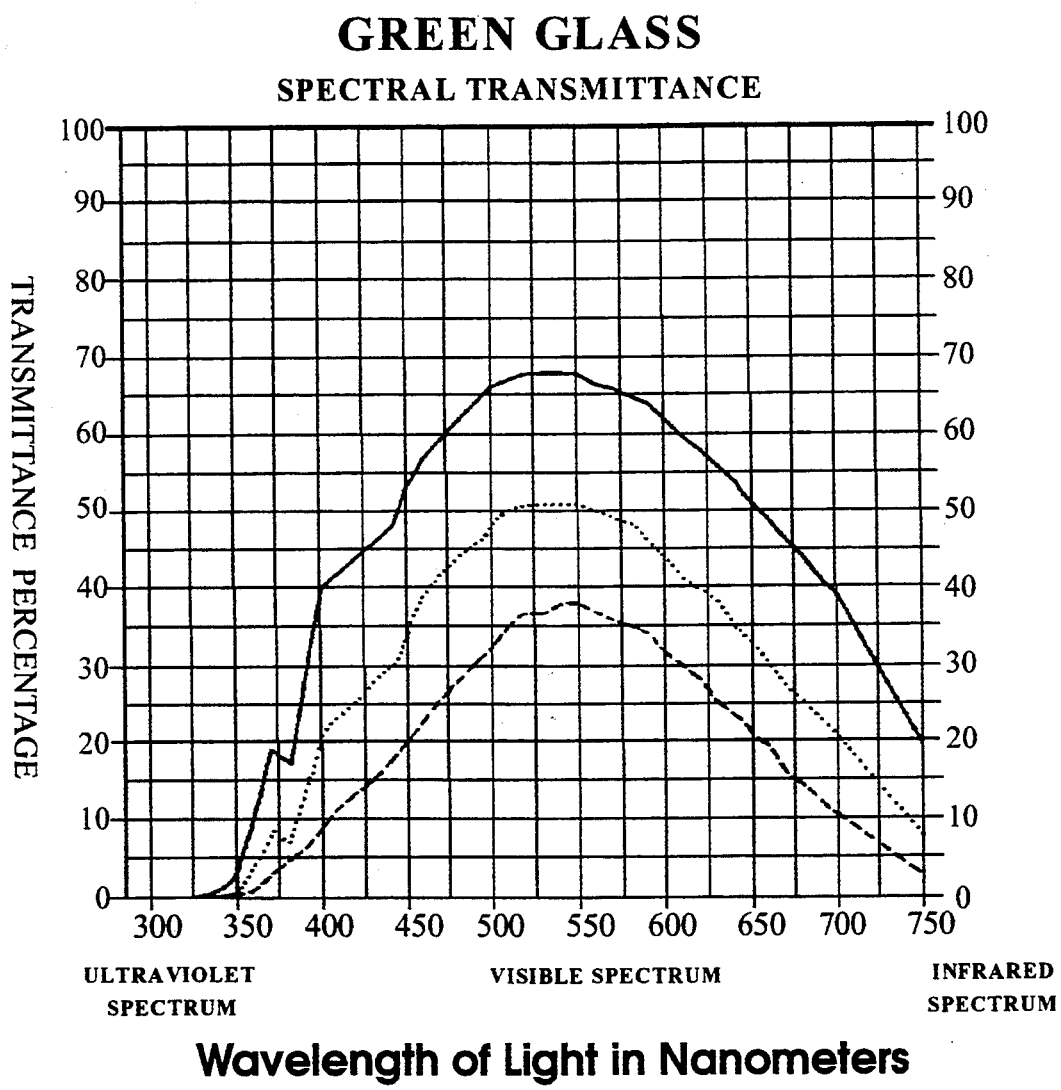
FIG. 2 illustrates a green glass lens transmitting primarily the middle wavelengths of the visible spectrum, while blocking out the shorter and longer wavelengths. Black pigments that absorb all wavelengths can be added incrementally to a green (or any lens) to reduce the all-over light transmission while maintaining the desired color.

FIG. 1 illustrates that clear glass transmits all colors equally. FIG. 2 illustrates that green glass filters out the red and blue spectral bands of light. FIG. 2 also illustrates that a color can be darkened by the addition of pigments that absorb all colors equally.

The invention is a binocular viewing device that enhances the colors of the visual environment. It comprises specifically manufactured and light transmission-balanced colored lens pairs. One lens of the pair transmits light predominately in the shorter wavelengths of the visual spectrum (400 to 550 nm.), and the other lens transmits light predominately in the longer wavelengths of the visual spectrum (550 to 750 nm.).

FIG. 3 illustrates the light transmission graph of a lens that passes the shorter wavelengths of light and has a cyan color. FIG. 4 illustrates the light transmission graph of a lens that passes the longer wavelengths and has a yellow-orange color.

Figure 5:
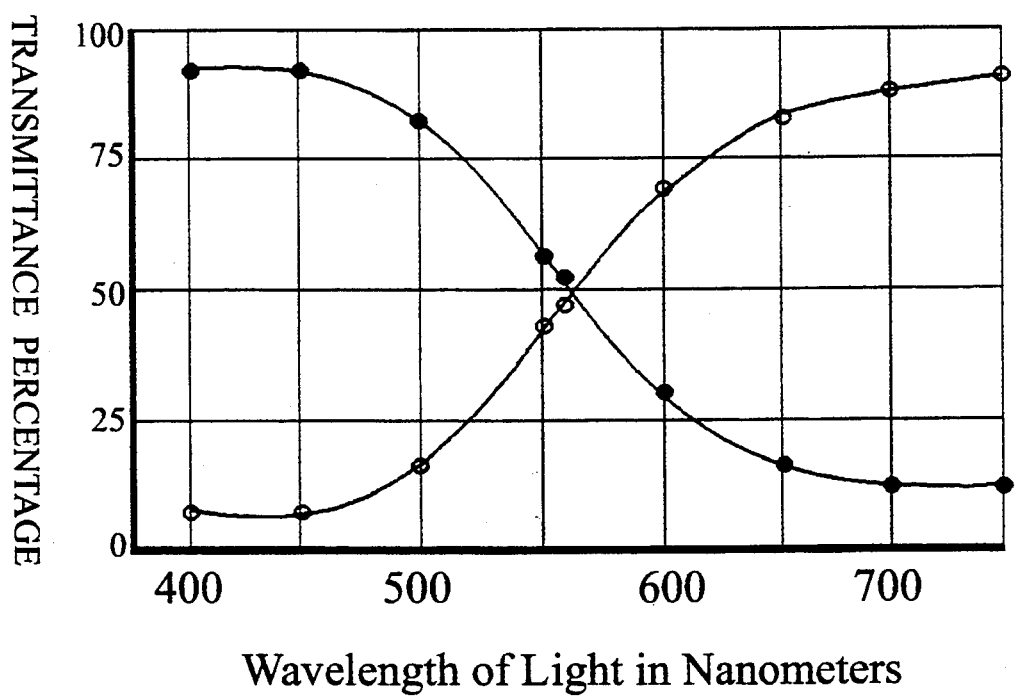
FIG. 5 illustrates the lenses of FIG. 3 and 4 combined as a pair of ideal color and total light-balanced lenses. The sum of light energy allowed to be transmitted by the two lenses at all wavelengths is approximately the same. Although all lenses produce some light reduction percentage, for example, clear lenses will reduce light transmission by 5-10%, by the present invention 100% of the light allowed to be transmitted by the inventive lenses is formed by a combination of the two lenses producing enhanced color perception. For example.

There are two design requirements for the lens combination to function adequately as a color and vision-enhancing device:

(1) At any specific wavelength of light, the combination of the light energy of the lens pair is equivalent to the combination of the light energy at any other wavelength. Stated another way, the two graphs representing the wavelength transmissions should combine mathematically to produce a flat graph line that indicates all colors are being transmitted approximately equally (none are subtracted out) when both lens transmissions are combined. This is illustrated in FIG. 5. It is possible, however, to achieve the effect of the invention due to biological variances between the two eyes, if the combined transmission value of any specific wavelength varies from the ideal by as much as 50%, and preferably 40%.

(2) The total light transmitted through each lens of the pair should be the same. In FIGS. 6 and 7, the area under the transmission curve of each lens of the pair is the same, indicating equal light transmission. It is possible, however, to achieve the effect of the invention due to biological ocular variances between the two eyes, if the light transmission varies by up to 25%, and preferably 20%.

The light transmission curves of the lenses are achieved by additives added to each lens during manufacture which block or reduce certain specific wavelengths of light (subtracting out this wavelength) while allowing other wavelengths to pass. One of ordinary skill in the art would know how to manufacture lenses to produce the desired transmission of light at the desired wavelengths according to the graphs shown in FIGS. 3–7 and 9. Some manufacturers familiar with the necessary procedures are North American Coating Company of Cleveland, Ohio, Gentex Optical of Carbondale, Pa., and CVI Laser, Inc. of Albuquerque, N. Mex.

In the case of a yellow glass lens, cerium oxide can be used as the sole additive or possibly combined with such minerals as nickel or cadmium to block the blue spectrum to the desired degree. In a blue glass lens, cobalt can be used in varying percentages to block the longer light wavelengths to achieve the desired transmission values.

In plastic lenses, organic dyes can be admixed with the plastic to achieve the desired non-passage of certain light wavelengths. Dyes can also be absorbed onto the surfaces of the plastic lenses, different dyes on each surface, to block the undesired light wavelengths in order to achieve planned transmission values.

In both plastic and glass lenses, the desired light-spectrum transmission values can be achieved by vacuum depositing the appropriate minerals or chemicals on the surface of the lens. This can be achieved by multi-layering of different compounds to achieve the desired light transmittance. This procedure is known to one of ordinary skill in the art.

Different colored lenses, with different transmission properties, may also be cemented together, forming a wafer lens.

A film may be placed in the plastic lens in the molding process. The film will have a desired light transmission value, and the surrounding plastic material, hardened into a lens, may have different transmission values.

All of the above methods and others can be combined by one of ordinary skill in the art to achieve the desired wavelength transmissions through a singular lens by following the inventive light transmission parameters described herein.

The light transmission graphs of the lens pair is determined by the intended use. In the situation of a simple "sunglass" that reduces the total light transmitted to the eyes while retaining natural color balance with hue enhancement, one need only balance the two lenses as to total light transmitted and percentage of light energy transmitted at each significant hue. A graph of the desired light transmission at each wavelength is prepared for one of the lenses. The percentage of light transmitted at each 50 nm. interval is measured. Then, to get the graph of the companion lens that will integrate with the first lens, one subtracts the difference from the first lens' value from the total light transmission desired at each 50 nm. interval, placing a dot on the graph at that spot, as shown in FIG. 5. For instance, if the first lens had a light transmission value of 20% at 450 nm. and the total light transmission desired to be allowed through for the two lenses combined was 90%, then 90 minus 20 equals a 70% transmission value at 450 nm. for the second lens so that allowed light transmission equals 100% of the desired transmission.

Going a step further, if the first lens had a transmission value of 45% at 530 nm., then the second lens would also require a transmission value of 45% at 530 nm. so that the total transmission value of the two lenses is maintained at 90% for the 530 nm. wavelength. In this example, the percentage of total light transmission of the two lenses combined is 90% and all or 100% of desired total light transmission is achieved. However, the light seen by the observer would be only 45% of that seen by an observer not wearing the lens pairs of the example, because a non-colored (clear lens) would transmit 90% of the light to each eye. Thus, the pair of lenses of different colors will effectively be a sunglass with a light reduction of 55% (100% minus 45%) compared to wearing no glasses.

Color deficiency is the result of poorly or nonfunctioning pigment in the affected cones of the retina. A green deficient retinal cone has pigment that does not respond properly to light in the green band, in the range from 500 to 540 nm. The cone will respond to absolute light values and transmit that information to the appropriate large retinal ganglia, but the small, color sensitive retinal ganglia will not be stimulated. The observer will not see a green object as green but as grey (as in black-and-white photography).

The present invention bypasses this retinal cone barrier to green color perception. The deficient green-sensitive retinal cones are sensitive to colors beyond the range of deficiency, such as blue-green and yellow-green. In the case of a pair of lenses in which one cyan colored lens transmits blue-green, this blue-green will overpaint the green object seen as grey, giving it a bluegreen hue. The other yellow-green colored lens will overpaint the green-seen-as-grey object with yellow-green. Each eye will transmit different color overlays of the "grey" object to the brain. With the inputs balanced as to total light at the various color wavelengths, the brain will integrate and summate the colors, which will cause the green components to add their values while the blue and yellow components neutralize each other and form grey-white light. The result is an unsaturated green that approximates the original green color of the object.

Red color deficient individuals are also cyan-deficient. The reason for this is that the pigment in the red retinal cones is no longer sensitive to red, allowing light to stimulate the "non-red" pigments of the cone, which are especially sensitive to cyan light. Cyan light stimulates the deficient red cones such that the red-sensitive ganglia are stimulated, and cyan light is interpreted as red by the red cone receptors. But the cyan light, being composed of approximately equal parts of blue and green, also stimulate the red and blue receptors. When all three of the receptors are stimulated approximately equally, the sensation is that of white or grey. Thus, cyan is not seen. Cyan can only be seen if the red receptor is non-responsive in the presence of cyan light, as happens in non-red deficient persons. Cyan is the absence of red, just as red is the absence of cyan.

In the case of a red-color deficiency in the range of 630 to 750 nm., the colors of the correcting lens pairs would be skewed toward the longer wavelengths of the visible spectrum. A first lens would be comprised of an orange lens with a peak of transmission of 610 nm. combined with a cyan lens having a peak of transmission of 490 nm. FIG. 9 represents appropriate graphs and transmission values determined for the second lens after selecting the transmission graph for the first lens.

In red color deficiency, the deficient red-sensitive retinal cone is not perceiving red but is sensitive to orange and to blue-green. A red object that is seen as grey is thus overpainted with both orange and blue-green. But in this case, the situation is different from that of the green-deficient color mechanism described above. The red-efficient cone is unusually sensitive to other colors when the red pigment is not-functioning. Orange is seen as yellow, but the blue-green color, having both blue and green components, summate to stimulate the cone and cause it to send an impulse to the red-sensitive small ganglia. This is perceived as if a red light had stimulated the red cone. The impulse sent to the brain from the red-sensitive cone is that of a stronger red combined with weaker yellow, because the yellow did not stimulate the cone as strongly. The integrated result is that the grey object will now appear red.

Deficiencies of the blue cones are rare and would be overcome by the mechanism described for red deficiency improvement. The lens pair for correcting blue deficiencies would be skewed to the shorter wavelengths, such as a violet-yellow lens pair. The blue-deficient retinal cones are unusually sensitive to yellow, which is a combination of red and green. This special sensitivity causes the blue cone with deficient blue-absorbing pigment to respond to yellow light (yellow is "minus blue"), sending off a stimulus to the blue-sensitive ganglia. The situation is as if blue light had been perceived. This blue sensation from one eye is combined with the violet color of the other eye to produce an integrated blue color, approximating the color from a blue object that a normal person would discern.

The present invention for treating color deficiencies is operative in the natural environment where colors are not fully saturated. An unsaturated color contains some white light, which means that some light will be transmitted through a filter of any color.

In a lens pair designed to treat color deficiencies, the usual optometric methods are used to determine both color insensitivity and degree of loss of color perception. In lesser degrees of color deficiency, the peak colors of the correcting lens pairs are usually further removed from the color not perceived, measured in nanometers, on the long and the short wavelength sides of the area of deficiency, than in more severe color deficiencies.

By the present invention a lens pair of different transmission characteristics for the correction of color deficiencies includes one lens transmitting predominately the wavelength band from 400 through 550 nm., the other lens transmitting predominately the wavelength band from 550 through 750 nm. This lens pair presents certain logistic problems in testing and prescribing for a color-deficient user.

Figure 10:
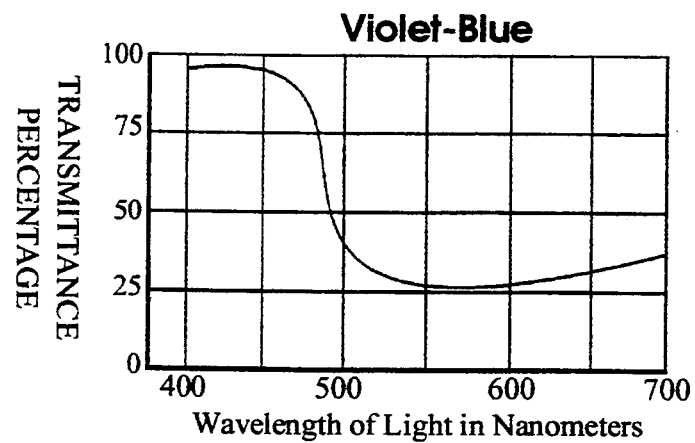
Figure 10:
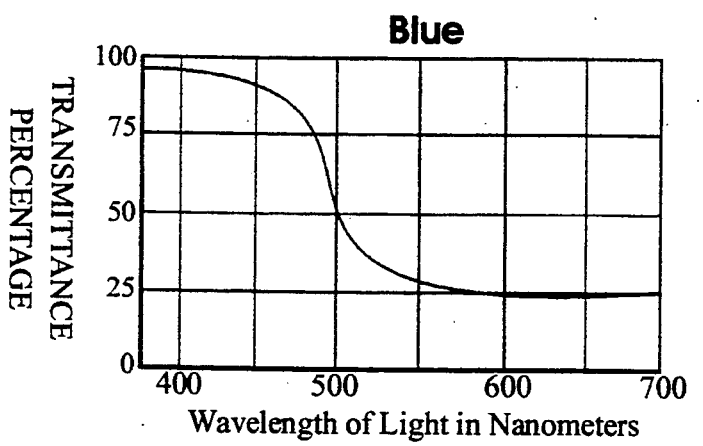
Figure 10:
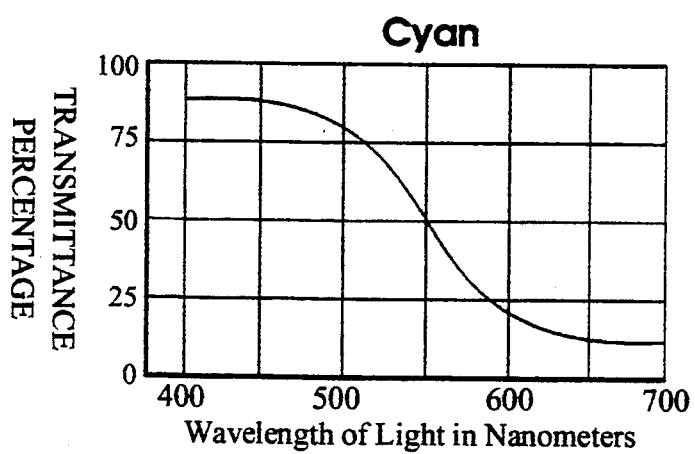
Figure 11:
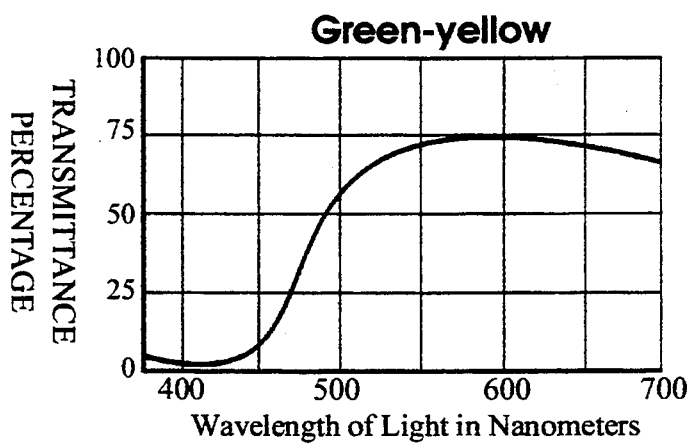
Figure 11:
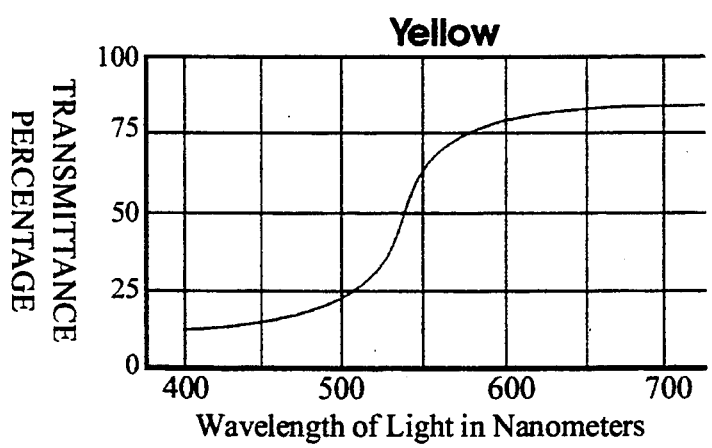
Figure 11:
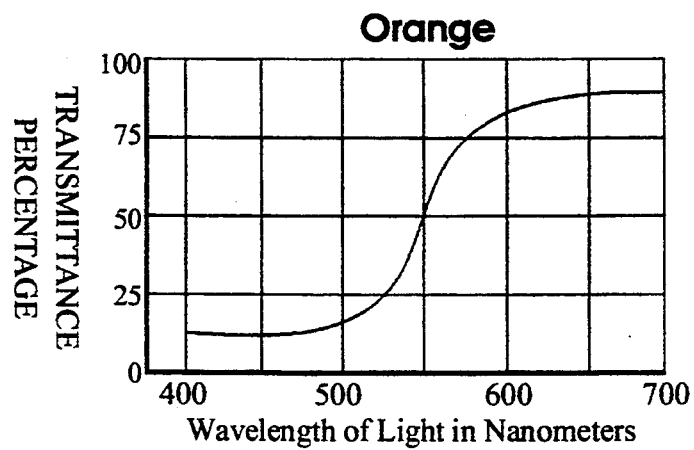

In order to simplify the above-cited problem, three representative lenses are chosen that have predominant transmission in the 400 to 550 nm. transmission band (violet-blue, blue, and cyan), and three representative lenses are chosen that have predominant transmission in the 550 to 750 nm. transmission band (green-yellow, yellow and orange). FIGS. 10 and 11 illustrate the transmission characteristics of these lenses.

The lenses are used in pairs, one lens from the 400 to 550 nm. range of the spectrum, and the other lens from the 550 to 750 nm. range of the spectrum. The subject views appropriately colored objects, some of which are the color of their deficiency as previously determined by standard optometric means. The subject regards the objects through the nine possible combinations of the six lenses and selects the combination that best renders the desired color benefit. If one eye is relatively deficient, the nine combinations are again shown but with the placement before the eyes reversed. The total possibility of lens combinations before the two eyes is eighteen.

To minimize the difficulty in testing, the three lenses in the 400 to 550 mn. range are combined into one lens, as are the three lenses in the 550 to 750 nm. range combined into one lens. This is achieved by cutting each lens such that the lens will occupy one-third of the final, combined lens, as shown in FIG. 12. One of the composite lenses will contain equal pie-shaped segments containing violet-blue, blue, and cyan. The other composite lens will comprise equal pie-shaped segments of green-yellow, yellow, and orange.

The composite lenses can be cemented together or held together by a containing frame. The ring can be friction-augmented so that the lens can be rotated in a containing frame. A notch or other mark can be placed at the junction of the dissimilar lens sections so the lens sections will be aligned appropriately before the eyes by using a special frame.

The composite lens pair is put into a device so that the lenses are held before the eyes. The device is adjusted so that the eyes see through the superior-most portion of each lens, and the other colors of the composite lens are ignored, much as one wearing bifocals or trifocals ignores the lower part of their glasses when viewing distant objects.

The device functions by viewing simultaneously through the lens pairs, which represents a lens from the 400 to 550 nm. wavelength area combined with a lens from the 550 to 750 nm. wavelength area. One of the lenses is rotated, and the subject's response noted. The rotation of this lens goes through a circle in 120 degree increments. This will expose the viewer to three color combinations.

The lens that had not been rotated in the above testing is then set on its second color segment by rotating it 120 degrees. The previously rotated lens is again rotated through its three colors. This testing achieves three more color combinations for the correction of color deficiencies.

The lens that had not been rotated fully is now set on its third color, and the other lens is rotated through its three colors. This yields three more color combinations for a total of nine combinations.

If the two eyes are not equal, the above procedure is repeated after the lenses before the eyes are switched. The total of the tested color combinations is eighteen.

Thus, the reader will appreciate that the fusion of six different lenses into two allows the easy testing of eighteen color combinations with only two composite lenses.

With reference to FIGS. 14-16, the lens holding device is generally designated as 20. The lens holding device includes two lens holders 22, 24 interconnected by a bridge 26 having nose pads 28. Secured to each lens holder is an ear piece 30, 32, respectively.

Each lens holder includes a tension spring 34, 36 which is used to hold lenses as shown in FIGS. 12 and 13, in place. A knob 38 is located at the base of each lens holder.

As shown in FIG. 16, two composite lenses 40, 42 are held in place by tension springs 34, 36 which rest on a peripheral edge of each lens. A knob 38 at the base of each lens holder engages in a groove formed between adjacent sections of each composite lens. The composite lens 40, 42 are manually rotated such differing sections are located at an upper position as shown by the composite lenses shown in FIG. 16. Viewing through the sections of each lens allows testing of eighteen different lens combinations, when the lenses 40 and 42 are switched in position and again rotated through the various combinations of viewing.

The colors comprising the sections of the two composite lenses may contain any colors so long as they are balanced in transmission values relative to each other.

An eyeglass frame to hold lenses before the eye resembles the "half-eyes" style of reading glasses. The special changes are (1) the lenses may be easily replaced by lifting them from the lens-holding mechanism; (2) the lens-holding mechanism contains a tension device (such as a spring) that prevents free rotation of the lens; and (3) there is a protruding knob in the lens-holding device that engages with a notch in the inserted lens so that the appropriate alignment of the lens is readily ascertained, as shown in FIG. 14.

This special frame holds the composite 3-in-1 lenses. A lens can be rotated by placing a finger on the lens and moving it in the desired direction. The rotation to position the lens properly is achieved when the notch of the lens engages the knob of the lens-containment device. This frame is positioned so that the viewer will see through the upper part of the composite lens and not through the center.

To utilize these color lens combinations, the subject wears spectacles or contact lenses of the selected color pair combination. However, any binocular optical device can utilize this invention by incorporating appropriate color pairs. This includes, but is not limited to, binoculars, skiers' goggles, shooters' glasses, binocular telescopes and microscopies.

The specifically manufactured and light transmission-balanced lens color-pair combinations can be used by persons of any age in a myriad of circumstances to enhance vision and color discrimination. These lenses may or may not incorporate a prescription for correction of refractive errors.

The lenses may contain different colors and degrees of saturation of hues. The lenses may have optical coatings for effects such as anti-reflectionqualities or ultraviolet wavelength absorption. The lenses may touch the eye, as in contact lenses, or may be in spectacle frames. The lenses may be in optical devices, such as binoculars, telescopes, microscopes, goggles, intro-ocular lenses and similar contrivances. The lens may consist of any colored transparent material. The color of the lens can be in the lens itself or by a colored coating on the lens.

Having described the invention, many modifications thereto will become apparent to those skilled in the art to which it pertains without deviation from the spirit of the invention as defined by the scope of the appended claims.

I claim:

1. A binocular viewing device for enhancing visual perception, said viewing device comprising:
   two colored lenses,
   one of said colored lenses transmitting a majority of visible light having a wavelength in the range of 400 to 550 nm. and absorbing a majority of visible light greater than 550 nm.,
   the other of said two colored lenses transmitting a majority of visible light having a wavelength in the range of 550 to 750 nm. and absorbing a majority of visible light less than 550 nm.,
   said two colored lenses, at any specific wavelength of visible light between 400 and 750 nm., having a combined transmission of light energy equal to at least 50% of a combined transmission of light energy of said two colored lenses at any other specific wavelength of light, and
   said one colored lens and said other colored lens being color balanced to have a total amount of visible light transmitted through said one colored lens being equal to a least 75% of a total amount of visible light transmitted through said other colored lens.

2. A binocular viewing device according to claim 1, wherein said combined transmission of light energy is equal to at least 60% of said combined transmission of light energy of said two colored lenses at any other specific wavelength of light.

3. A binocular viewing device according to claim 1, wherein said lenses are balanced to have a total amount of light transmitted from said one colored lens being at least 80% of a total amount of light transmitted through said other colored lens.

4. A method of enhancing visual perception, said method comprising the steps of:
providing two colored lenses, and
placing one of said two colored lenses before the right eye of a user and placing the other of said two colored lenses before the left eye of the user for simultaneously viewing an image through said two lenses, one of said two colored lenses transmitting a majority of visible light having a wavelength in the range of 400 to 550 nm. and absorbing a majority of visible light greater than 550 nm., the other of said two colored lenses transmitting a majority of light having a wavelength in the range of 550 to 750 nm. and absorbing a majority of visible light less than 550 nm., said two colored lenses, at any specific wavelength of visible light in the range from 400 to 750 nm., having a combined transmission of light energy equal to at least 50% of a combined transmission of light energy of said two colored lenses at any other specific wavelength of light, and said one colored lens and said other colored lens being color balanced to have a total amount of light transmitted through said one colored lens being equal to at least 75% of a total amount of light transmitted through said other colored lens.

5. A method according to claim 4, wherein said combined transmission of light energy is equal to at least 60% of said combined transmission of light energy of said two colored lenses at any other specific wavelength of light.

6. A method according to claim 4, wherein said lenses are balanced to have a total amount of light transmitted from said one colored lens being at least 80% of a total amount of light transmitted through said other colored lens.

* * * * *